Patented Jan. 12, 1943

2,307,962

UNITED STATES PATENT OFFICE 2,307,962

SHEETING

Paul C. Seel, Rochester, N. Y., assignor to Eastman Kodak Company, Rochester, N. Y., a corporation of New Jersey No Drawing. Application January 12, 1939, Serial No. 250,641

1 Claim. (Cl. 117—73)

This invention relates to the manufacture of coated sheets, tape and films and, more particularly, to a composite transparent sheet comprised of a cellulose acetate or similar aliphatic acid ester of cellulose, having an interposed binder layer for strongly attaching the cellulose ester to a thermoplastic synthetic resin layer.

This application is a continuation-in-part of my copending application Serial No. 124,925, filed February 9, 1937, now Patent 2,263,015.

The manufacture of various coated sheets, tapes and films for a variety of purposes has commercial importance and has been the subject of considerable investigation. For example, in my Patents Nos. 1,496,359, 1,687,041, 1,687,042 and 1,933,824, I have shown a number of different types of coated sheets, films, tape and the like, together with some of the articles of manufacture resulting therefrom and methods of use and manufacture. In addition to the aforementioned types of coated sheets, I have found a novel article of manufacture comprising at least the three strongly attached layers, an organic cellulose derivative base, an interposed binder layer, and a layer or skin of thermoplastic synthetic resins. This article of manufacture also has a number of methods for its manufacture and uses commercially.

This invention has for an object to provide an article of manufacture comprising a composite article comprised of a flexible cellulose organic acid ester film that is transparent, an interposed binder and hinge layer, and a heat and pressure-sensitive, fusible skin of a thermoplastic synthetic resin. A further and particular object is to provide a composite sheet or tape comprised of at least three layers especially resistant to separation at the interfacial boundaries between the layers. A still further object is to provide a transparent or translucent composite film largely comprised of an organic acid derivative of cellulose, which film may be rolled, stacked and otherwise handled or employed. A still further object is to provide a transparent or translucent flexible composite film or tape comprised of a subbed cellulose organic acid ester supporting thermoplastic synthetic resin which is heat and pressure-sensitive and capable of heat lamination. Still another object it to provide a transparent or translucent flexible composite sheet, tape or film, the surfaces of which are non-tacky. Still another object is to provide as an article of manufacture a transparent sheet or tape comprised of a cellulose organic acid ester base supporting a resin, a surface of which article of manufacture is capable of heat fusing to colored or printed and other type surfaces. Still another object is to provide a method for preparing the aforementioned article of manufacture. Other objects will appear hereinafter.

I have found that a novel and useful article of manufacture in the form of a composite sheet, tape or film may be comprised of an organic derivative of cellulose having an interposed binder layer supporting an attached, thermoplastic, synthetic resin. The cellulose ester base preferably would be transparent or translucent and comprise the cellulose acetate or other aliphatic acid derivative material usually used for conventional sheeting, film or the like. The interposed binder layer would be as described herein. The synthetic thermoplastic resin will likewise be transparent or translucent and may comprise any one of several known resins, such as, for example, polymerized vinyl chloride, acrylates and alkyd resins. The several Ostromislensky patents of which may be mentioned 1,721,034 and 1,791,009 may be referred to for a description of various forms of polymerized vinyl chloride, and their manufacture.

However, I will set forth hereinafter, for the purposes of illustration, further details relative to the manufacture, solution and other information respecting synthetic resins. In the following description, for convenience of reference and brevity, the following terms or abbreviations may be used. For example, there are several modifications of polymerized vinyl chloride, and the terms alpha, beta and caouprene chloride all refer to synthetic resins. Inasmuch as a detailed discussion relative to the manufacture and properties of various cellulose organic acid esters, such as cellulose acetate and other aliphatic acid derivatives, may be found in a number of patents and publications, an extended description thereof will be omitted from the present application. The term subbing solution as employed herein refers to solutions suitable for coating and in particular to my interposed binder layer. That is, a subbing solution as used herein means liquids or solutions which are capable of forming a skin, film, tape, layer or other deposit when cast or coated out, dried, evaporated or otherwise treated, the sub being the resultant skin, film or layer.

As already mentioned, there are a variety of synthetic resins, and, for example, several modifications of polymerized vinyl chlorides (caouprene chloride) namely: alpha, beta, delta and gamma. The alpha modification is fairly soluble in acetone, although it does not produce a solution of the same consistency as either acetate or nitrate dope. The beta modification is insoluble in acetone, but is somewhat soluble in a mixture of chlorobenzene and acetone to approximately a 6-8% solution.

Very little difficulty, if any, has been experienced in the manufacture of synthetic resins such as vinyl chloride from ethylene chloride. The vinyl chloride may be polymerized into one of a number of the aforementioned modifications of the so-called caouprene chloride.

The polymerization of vinyl chloride into one of the four forms aforementioned may be accomplished either by exposing the vinyl chloride liquid under pressure in sealed tubes to ultra-violet light or to sunlight, or by exposing the vinyl chloride absorbed in such solvents as acetone, ethyl alcohol, methyl alcohol, chlorobenzene, etc., to the action of either ultra-violet lamps or sunlight.

It is preferable to use quartz containers for this operation as ordinary glass containers absorb a large percentage of the ultra-violet rays and the reaction time is thereby lengthened. Various methods known and disclosed in the prior art for producing the polymerized vinyl resins may be employed.

The following examples which I have carried out or had carried out under my direction indicate how vinyl chloride may be polymerized, dissolved and otherwise treated. For example, it is possible to polymerize liquified vinyl chloride in quartz containers under an ultra-violet light in several hours' time to the beta modification. It is also possible by exposing the liquified vinyl chloride in a quartz tube to sunlight, and after a period of time, to cause polymerization to take place.

Another treatment which has been given the polymerized product in methyl alcohol has been to remove the polymerized product from the polymerization treatment, filter, dry and weight it. It was then extracted for a number of hours in acetone in an extraction apparatus. Following the extraction it was removed and wet with acetone to purify and then packed in containers still wet with acetone. It was found that the beta caouprene chloride when once dried after extraction with acetone was more difficult to dissolve. For this reason it was left wet with acetone for further use.

The beta modification may be dissolved for example in a solvent comprising about 75% monochlorobenzene and 25% acetone. The beta modification may be readily dissolved in such a solvent if the temperature is held at between approximately 150° F.–190° F. Various temperatures between, for example 150–170° F., may be employed for dissolving various amounts of polyvinyl chloride. It is also possible to use other solvents as will be indicated hereinafter, but I prefer to proceed as set forth and employ the chlorobenzene-acetone solvent. The solution containing the synthetic thermoplastic synthetic resin, namely, the caouprene chloride solution, may be employed in a number of ways. That is the solution may be coated into skins or sheets comprised solely of the synthetic resin.

I have had a number of said sheets prepared and tested. From this and other investigations I am aware that polymerized synthetic resins are heat-sensitive and may exert a cementing action. For example, as I have pointed out in connection with other work, vinyl chloride, vinyl acetate, styrene or their polymers may be used as a splicing cement for films either as a liquid or coated out in sheet form. In the case of sheet coatings, the material will be placed between two layers of films to be spliced together and the joint made by applying a moderately warm iron. My synthetic resin-containing solution may, for example, be applied to coated cellulose acetate base to form composite sheets, tapes or films and it is with this type of article of manufacture and its method of production that I am primarily concerned.

With further respect to the manufacture of composite sheets the following examples have been carried out:

*Example I.*—Separately prepared cellulose acetate and cellulose ether thin sheets were coated with a subbing solution of chlorinated rubber. Thereafter the synthetic resin, polyvinyl chloride, was applied to the chlorinated rubber surface of the aforementioned sheets. The finished articles obtained in these instances were tri-layer sheets comprising an organic derivative of cellulose layer, an interposed binder layer of chlorinated rubber, and an external thermo-sensitive adhesive layer of synthetic resin.

*Example II.*—In accordance with this example cellulose acetate and cellulose ether sheets as in Example I were coated with shellac, followed by the application of the polyvinyl chloride layer. In addition, in one instance in place of the shellac layer, a gum layer was employed for the interposed coating. In another instance a mixture of gum and polyvinyl chloride was applied for the intermediate coating. Thereafter the synthetic resin was applied to the gum-resin intermediate coating.

*Example III.*—Two cellulose acetate films were subbed with a nitrate solution and then this interposed nitrate binder layer was coated with a 2% solution of beta caouprene chloride in chlorobenzene and acetone.

*Example IV.*—In this instance a preformed transparent cellulose acetate thin sheet was coated with a thin layer of cellulose acetate followed by polyvinyl chloride resin as the external coating. The composite sheet from this experiment, when tested, showed that the polyvinyl chloride resin was not firmly adherent and stripped off.

*Example V.*—A cellulose organic acid ester film or skin in this example was subbed with 3% of a nitrate cotton in 75% acetone-25% chlorobenzene. This composite cellulose derivative base was then coated on the nitrate side with a 3% beta caouprene chloride solution in chlorobenzene. The beta caouprene chloride held strongly in this example.

It is apparent from the preceding examples that I have provided a flexible, translucent, and transparent cellulose organic acid ester base provided with an interposed binding layer supporting heat and pressure-sensitive fusible thermoplastic resins. I have found that cellulose organic acid ester bases essentially comprised of cellulose acetate coated with cellulose nitrate or other suitable interposed materials, possess certain advantages. For example, cellulose nitrate being more readily available and less expensive, may lessen the cost of producing my article of manufacture. In addition, the employment of the interposed binder layer or sub which I have described in the examples permits the utilization of a variety of resins with somewhat better adherence than is possible to apply directly to cellulose acetate. Generically, my novel sheet may be considered as being comprised of a least three layers, as a cellulose acetate layer of a few thousandths of an inch thickness or less, (for example between .0005 to .015), an interposed cellulose nitrate layer securely adherent to the acetate layer, and a synthetic resin layer which may, if desired, be thinly overcoated with a non-tacky material because of the adhesive nature of the synthetic resins.

It should be noted that my novel article of manufacture comprises several layers in contrast to a single sheet made up of a mixture of the aforementioned constituents. As indicated, the interposed layer, preferably cellulose nitrate, acts to securely bind the adhesive layer which is usually a synthetic resin but may comprise other plastics as for example the thermoplastic derivative of Example I, rubber polymers, or other similar rubber derivatives to the organic acid derivative of cellulose. By means of my novel article of manufacture increased resistance to peeling such as might occur under some conditions of usage, and other advantages may be obtained.

When I refer to material essentially comprised of cellulose acetate, I refer to either the plasticized or non-plasticized cellulose acetate sheeting. For example, certain of the cellulose acetate sheets empolyed were plasticized with, for example, 20% of monochloronaphthalene. Various other plasticizers such as diethyl phthalate, triphenylphosphate, and triacetin in conventional quantities, may be used in the cellulose organic acid derivative sheets employed in this invention. Also, if desired, the acetyl derivative may be in full or in part replaced by propionyl, butyryl and other aliphatic acid derivatives. Similar remarks apply to the cellulose nitrate and synthetic resin layers. These materials may be comprised of usual commercial constituents or specially purified or plasticized compositions may be used. By the term "essentially comprised" I include such compositions.

Since I have provided transparent or translucent sheets which are non-tacky, flexible, relatively impervious and insoluble in water, my sheets may be employed or handled in any of the known and usual ways according to which transparent sheets have been employed. For example, the sheets might be employed in a manner similar to or the same as shown in U. S. Patents 458,020, 1,756,919, and 1,827,992.

The articles of manufacture described in the aforementioned examples, as already indicated, were produced by a coating process similar to those described in my patents aforementioned. However, I prefer to follow procedure similar to that set forth in respect to Example V. The sheets essentially comprised of cellulose acetate may be coated out immediately prior to use or preformed sheets may be employed. These sheets would then be coated with an intermediate layer of cellulose nitrate. In some instances a more closely adherent bond between the various layers may be obtained where freshly prepared, namely, slightly green and uncured, sheets are employed, the subsequent layers being applied substantially continuously and consecutively. The synthetic resins were dissolved in the chlorobenze-acetone solvent. The solution was coated uniformly over an area of the coated cellulose organic acid derivative. The solvent was substantially completely evaporated therefrom leaving a relatively thin flexible non-tacky resinous skin adherent to the composite base. As indicated, various coatings were employed, such as 2%, 5% and 10% solutions of the resin. If desired, the coatings may be cured at between about 160–170° F. for twenty minutes to a half hour. The completed articles of manufacture in the form of sheets, tape or film may be rolled, piled, packaged or otherwise employed as is conventional for similar types of articles.

What I claim and desire to be secured by Letters Patent of the United States is:

An article of manufacture comprised of a transparent covering essentially consisting of organic acid esters of cellulose, comprising a first layer of heat and pressure-sensitive vinyl resin, a second layer of plastic binder material of a chlorinated rubber securely bonded to the resin layer, and the aforementioned layer of protective lower organic acid ester of cellulose covering the preceding layers, said second layer being compatible with and serving to solidly bond the cellulose ester layer to the resin layer.

PAUL C. SEEL.